July 31, 1962  B. BARÉNYI ET AL  3,047,330
AUTOMOBILE WITH CAMPING BED

Filed Dec. 17, 1959  2 Sheets-Sheet 1

INVENTORS
BÉLA BARÉNYI
BY   HERMANN RENNER
ATTORNEYS

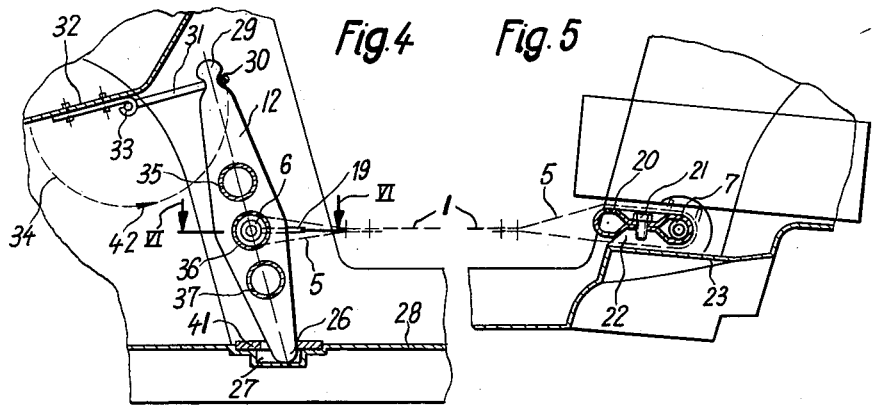
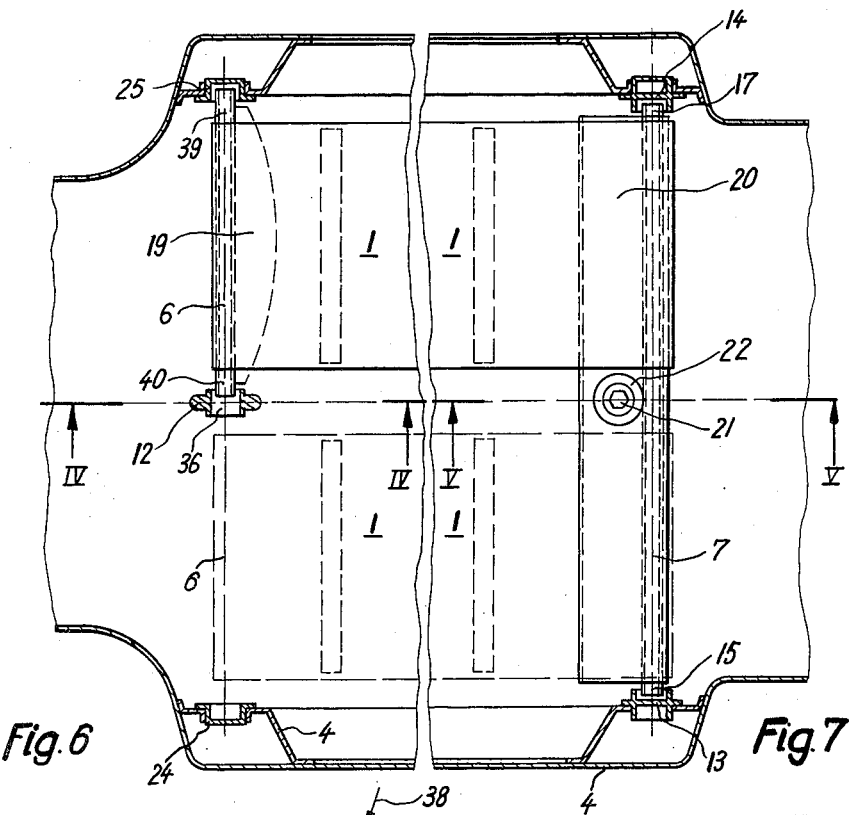
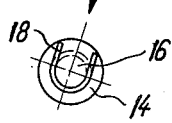

United States Patent Office 3,047,330
Patented July 31, 1962

3,047,330
AUTOMOBILE WITH CAMPING BED
Béla Barényi, Stuttgart-Vaihingen, and Hermann Renner, Magstadt, Germany, assignors to Daimler-Benz Aktiengesellschaft, Stuttgart-Unterturkheim, Germany
Filed Dec. 17, 1959, Ser. No. 860,241
Claims priority, application Germany Dec. 20, 1958
10 Claims. (Cl. 296—23)

The present invention relates to improvements in automobiles and more particularly in passenger cars.

It is the principal object of the present invention to provide an automobile, particularly a four-seat passenger car, which is designed especially for long trips or for camping purposes, or as a car for a physician or a hospital, and is adapted to have one or more beds, cots or the like installed therein in such a manner that such bed or beds may be very easily and quickly put up or again removed. Thus, for camping purposes, the entire floor space of the passenger compartment may, after the removal of the seats, be utilized for installing several beds, or only a single bed may be installed at the place next to the driver, for example, to permit a passenger or relief driver to rest or sleep during an extended trip or to permit the car to be used as an emergency ambulance, for example, for transporting a victim of an accident to a hospital, especially when a normal ambulance is not available. It is therefore especially desirable also for a physician who occasionally has to take a patient to his office or hospital for treatments which cannot be administered at the patient's home, or as one of the cars of the staff members of a hospital to be used as a relief ambulance in the event that the regular ambulance is away or a greater accident has occurred requiring immediate transportation of more victims to the hospital than can be carried by the regular ambulance.

A further object of the invention is to provide a bed, cot or the like for an automobile which, in the normal operation of the car when all of the seats are installed therein, may be placed in a very small space, for example, in the trunk compartment. Thus, the beds are designed so as to permit them to be taken along at all times without constituting a hindrance when a considerable amount of baggage is also to be carried in the same compartment.

These beds, cots or the like according to the invention may consist of suitable fabrics of textile or synthetic materials or of wire netting or a combination of such materials which may be easily folded or rolled up so as to assume the least possible space when not in use. When installed in the car, they may be removably secured either directly or indirectly to stationary parts of the car body so as to be stretched out and tightened. The beds or cots themselves as well as the means which form parts of the car for installing the cots therein are so simple and inexpensive that at least the latter will not require any increase in the purchase-price of the car.

Another important object of the invention is to provide a bed or cot of the type as described above which, despite its simplicity, is—when installed—of such a solidity as to support even the load of a very heavy person, but is also of such elasticity that such or any lighter person may rest or sleep thereon in considerable comfort. The bed or cot according to the invention is therefore not of a sagging hammocklike type which is generally regarded as unhealthful, but it supports the body of a person reposing thereon in a straight position in a manner very similar to an innerspring mattress.

A further object of the invention is to provide such a bed or cot for an automobile which may be very easily adjusted to different positions so as to permit a person to rest or sleep thereon either in a flat horizontal position or at any desired angle suitable for his comfort. This easy adjustability is also a very desirable feature if the bed is to support a sick or injured person whose head has to be rested either higher or lower than the other parts of his body.

These and other objects, features, and advantages of the present invention will become further apparent from the following detailed description thereof, particularly when the same is read with reference to the accompanying diagrammatic drawings, in which—

FIGURE 4 shows, on a larger scale and partly in cross-section, a side view of the stretching or tightening lever and its mounting means as seen in the direction IV—IV in FIGURE 6;

FIGURE 5 shows a cross section of the rear mounting, taken along line V—V of FIGURE 7;

FIGURE 6 shows a plan view of FIGURE 4, partly in a cross section taken along line VI—VI of FIGURE 4;

FIGURE 7 shows a similar plan view of FIGURE 5; while

FIGURE 7a shows a side view of a detail of FIGURE 7.

Figures 3, 3A:
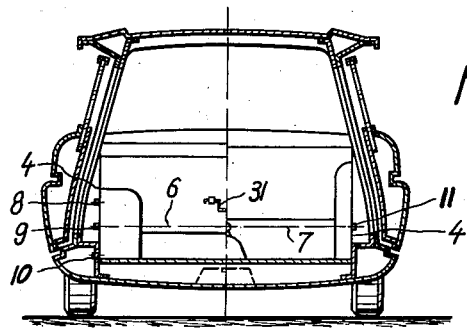
FIGURES 3 and 3a show cross sections of one side of the car taken along lines III—III and IIIa—IIIa of FIGURE 1, respectively.

Referring to the drawings, the beds or cots 1 may be made of wide strips of a flexible material of a limited degree of resilience, for example, a textile fabric, a fabric of a synthetic material, or one of wire netting, or a mixture of these materials. Each cot 1, when installed after the removal of the respective car seats extends in the longitudinal direction of the car and has a length which is at least equal to that of a full-grown person and a width slightly narrower than one-half of the inner width of the passenger compartment so as to permit only one cot to be installed at one side of the car after the front and rear seats 2 and 3 at that side have been removed, while the seats at the other side, or at least the driver's seat 2, remain installed so that the car may be driven while one cot 1 is made up and ready for use or occupied by a person lying thereon.

Figure 1:
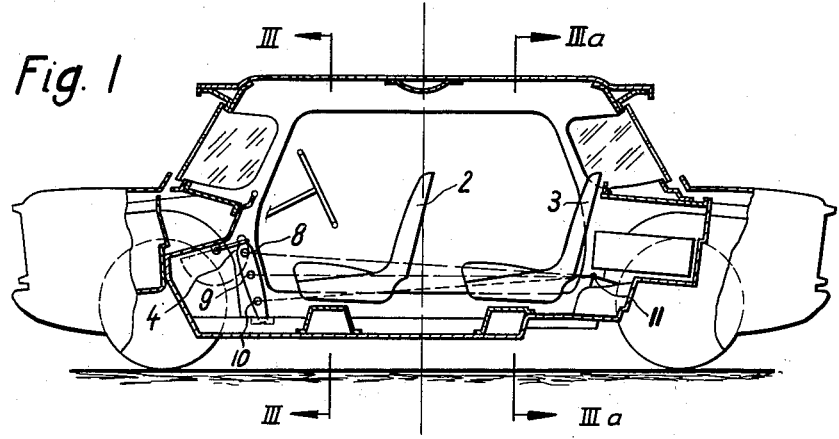
FIGURE 1 shows, partly in cross section, a side view of a four-seat passenger car and indicates in dotted lines the position of the bed or cot according to the invention with relation to the normal position of the seats and the various angles to which the bed or cot may be adjusted.
Figure 2:
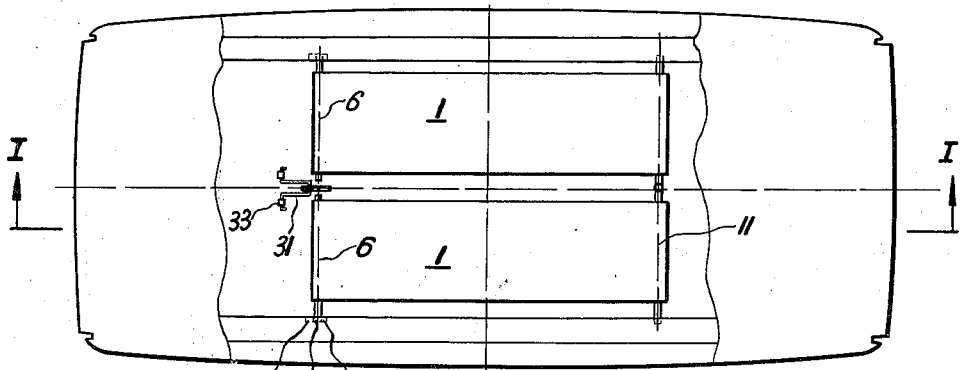
FIGURE 2 shows a bottom view of FIGURE 1, with the car bottom removed, of the beds or cots when installed.

As diagrammatically indicated in FIGURE 1, strips 1 forming the cots or beds may be removably secured to fixed uprights or wall portions 4 of the car body, such as the door posts, wheel partitions, inner walls, or the like, and preferably at points at the inside of the car which are easily accessible. The securing means may consist of rods, pipes, rings, eyelets, cords, or the like which may be inserted, hooked in, tied to or sewed upon each strip. Thus, for example, in the particular embodiment illustrated in the drawings, a loop 5 is formed at each end of strip 1 extending across the entire width thereof, and preferably tubular crossbars 6 and 7, as shown in FIGURES 4 to 7, are passed through these front and rear loops and are then removably secured to the car. For this purpose, either the front or rear inner walls 4 of the car or both are preferably provided with a plurality of connecting points to which the crossbars may be secured so as to permit the cot or cots to be installed either horizontally or at an angle or at different levels. FIGURES 1 and 3 illustrate, for example, three positions 8, 9 and 10 at three different levels at the front part of the car body, but only one position 11 at the rear part although the latter may obviously also be provided with several mounting positions at different levels.

While at the rear of the car, both strips 1, either separately or together, may be secured in place by a single crossbar 7 which extends across the entire width of the available space, as illustrated in FIGURE 7, it is advisable to secure each strtip at the front end by a separate crossbar 6 of a length corresponding to about one-half of the width of the car space, as shown in FIGURE 6, so that the driver's side may be left free of any crossbar when the cot next to his seat 2 is alone installed, since the presence of such a bar might interfere with his driving functions. Of course, if desired, the rear end of each strip 1 may also be separately secured.

The means for mounting the crossbars 6 and 7 in the various positions may consist, for example, of suitable apertures or recesses which are provided in parts of the inner side walls 4 of the car and in a central bracing and tightening member 12 at the front end of the passenger compartment. The apertures or recesses in the side walls may be either cut or impressed directly into these walls or additional sockets or the like may be secured to these walls or into such recesses or apertures therein.

Thus, for example, if the rear ends of cots 1 are to be secured by a single crossbar 7, as shown in FIGURE 7, such a bar may be mounted in a very simple manner, for example, by securing a pair of double sockets 13 and 14 at the same level in suitable apertures in the side walls 4 of the car body. One of these sockets, for example, the socket 13 may have a solid annular wall so that the end 15 of crossbar 7 may be inserted substantially in the axial direction into the open end thereof, while the opposite socket 14, as shown particularly in FIGURE 7a, has a lateral opening 16 to permit the end 17 of crossbar 7 to be pivoted into socket 14 from above and from one side. In order to prevent crossbar 7 from hopping out of the lateral opening 16 in socket 14, for example, when the car is driven over a bumpy road, this opening is provided in the upper side of the socket wall and at an inclined angle toward the rear. For greater security, the two sides of the socket wall which are separated by opening 16 may also be extended as shown at 18 so that the socket will have a rearwardly inclined U shape, as shown in FIGURE 7a.

In order to prevent crossbars 6 and 7 from bending under the considerable tension of cots 1 and the weight of a person lying thereon, each of them is reinforced by a lateral extension 19 or 20, respectively, which preferably extends substantially along the entire free length of the respective crossbar or at least along the length which corresponds to the width of cot 1. This reinforcement may be either integral with the crossrod itself or, as shown in FIGURE 5, it may form a separate member which is either welded or clamped to crossbar 7. This member 20 may be additionally secured at the center by a bolt 21 to a bottom part 22 of the car body, for example, on the top of the transmission case 23, particularly if only one pair of sockets 13 and 14 are provided at the rear, as indicated in FIGURE 1. If such sockets are, however, provided also at higher levels, suitable washers or other spacing elements may be placed underneath member 20 to compensate for the difference in level. Instead of the particular cross-sectional shapes of crossbars 6 and 7 including the reinforcements 19 and 20, as shown in FIGURES 4 to 7, they may also be of any other desired elongated shape, for example, of an oval, elliptical, tear-shaped, or U-shaped cross section, except for their outer ends 15 and 17 which are to be inserted into the sockets and preferably are of a solid or tubular circular cross section. The two outer sockets 24 and 25 at the front part of the car body which may be secured to the side walls 4 of the car body in a similar manner as sockets 13 and 14 may be of the same shape as socket 13 or of a simple cup shape, as shown in FIGURE 6. For removably securing one or both front crossbars 6 in a fixed position and for securing and tightening one or both cot straps 1, the tightening member 12 is provided which forms a lever, and the lower rounded end 26 of which may be inserted into a recess 27 in the center of the car bottom 28 so as to be pivotable therein. The rounded upper end 29 of lever 12 may be provided with a notch 30 or the like, and a U-shaped securing member 31 which is pivotably secured to the bottom wall 32 of the dash-board by hinge members 33 may be swung upwardly along an arc 34 and hooked over the upper end of lever 12 and placed into notch 30. When the cots are not installed, lever 12 together with crossbars 6 may be removed and member 31 may be pivoted toward the rear in the direction of arc 34 and then secured to wall 32 by a suitable device, not shown.

Tightening lever 12 is further provided with a plurality of short tubular inserts 35, 36, 37 which are disposed at different levels corresponding to the levels 8, 9 and 10 of sockets 24 and 25, as indicated in FIGURES 1 and 3, when lever 12 is in the secured position, as shown in FIGURE 4. Of course, as previously indicated, the number of sockets 24 and 25 and inserts 35, 36, and 37 may also be increased at higher or lower levels so as to permit cot 1 to be installed at a still greater number of different angular positions.

When not required, cot strips 1 may be rolled up and stored at any suitable place of the car together with crossbars 6 and 7 and tightening lever 12. If one or both cots are to be installed, the front and rear seats 2 and 3 at the respective side or sides of the car are first removed, Thereupon, the rear crossbar 7 with its reinforcement 20 thereon is inserted into the rear loop 5 or cot 1, and its end 15 is then inserted into the open end of socket 13 and thereafter its other end 17 into the lateral opening 16 in the direction as shown by the arrows 38 in FIGURE 7a. Then, bolt 21 is inserted into the reinforcing part 20 of crossbar 7 and tightly screwed into the bottom part 22 of the car.

The cot or cots 1 are then unrolled and spread out, and a crossbar 6 with reinforcement 19 thereon is slipped through the front loop 5 of each cot which is to be installed and its outer end 39 is inserted into one of the sockets 24 or 25 at whatever level may be desired. Thereupon, the inner end 40 of one or both crossbars 6 is inserted into one of the tubular inserts 35, 36, or 37 of tightening lever 12 which corresponds to the particular socket 24 or 25 into which the outer end of one or both crossbars 6 has already been inserted. The lower end 26 of lever 12 is then inserted into recess 27 in car bottom 28 which may be reinforced by a plate 41, whereupon the upper end of lever 12 is pivoted forwardly to tighten the cot or cots 1 until the U-shaped securing member 31, which has previously been pivoted in the direction of arrow 42 to a point above the upper end 29 of lever 12, may be slipped over this upper end and hooked into notch 30.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In an automobile having an enclosed passenger compartment defined by side walls and a bottom and having removable seats adapted to be removed to substitute therefor beds, the combination of at least two pairs of members on each longitudinal side of the passenger compartment having securing means disposed above the level of said bottom adapted to secure removable bed means, each of said bed means including a front crossbar and a rear crossbar each adapted to be secured by respective pairs of said members, and including a wide strip of material connecting each front bar with each rear bar, at least two of said pairs being mounted in a relatively fixed position in said compartment, means for adjustably mounting at least two laterally adjacent pairs of said members, tightening means for shifting said laterally adjacent pairs in the longitudinal direction of said compartment for tightening said strips, said adjustable mounting means and said tightening means including lever means, said lever means being rotatably secured to said bottom between said forward crossbars substantially on the longitudinal axis of said vehicle, each of said forward crossbars being removably mounted upon said lever means, and said lever means being adapted to tighten both of said strips simultaneously.

2. In an automobile having side walls and a bottom enclosing a compartment and at least two removable seats in said compartment, at least two pairs of members forming sockets disposed above the level of said bottom, the sockets of each pair being opposite to and spaced from each other, and facing with their openings toward each other transversely of said compartment, one of said pairs being disposed forwardly and another one of said pairs being disposed rearwardly of said compartment, one of said pairs of sockets being mounted in a fixed position in said compartment, means for adjustably mounting at least one socket of the other pair, a crossbar connecting the sockets of each pair, a wide strip of flexible material on said crossbars and connecting said bars to each other, said strip of flexible material extending substantially in the longitudinal direction of the vehicle through a region in said compartment normally occupied by the removable seats when said seats are in their normal position, tightening means for shifting said adjustable socket in the longitudinal direction of said compartment for tightening said strip so as to form a tightly stretched cot within said compartment, said adjustable mounting means of one of said sockets and said tightening means each including common lever means, said lever means being pivotably secured to said bottom so as to be pivotable in the longitudinal direction of said compartment, and locking means adapted to be secured to a stationary vehicle part near the front end of said compartment and adapted to engage said lever means to lock said lever means in a fixed position after it has been pivoted to tighten said strip.

3. In an automobile as defined in claim 2, in which each of said crossbars has a lateral reinforcement thereon projecting toward the other crossbar and extending along the greater part of the length of said crossbar.

4. In an automobile as defined in claim 2, further comprising means for permitting at least one of said crossbars to be removed from its sockets when said tightening means are released.

5. In an automobile having side walls and a bottom enclosing a compartment and at least two removable seats in said compartment, at least two pairs of members forming sockets disposed above the level of said bottom, the sockets of each pair being opposite to and spaced from each other, and facing with their openings toward each other transversely of said compartment, one of said pairs being disposed forwardly and another one of said pairs being disposed rearwardly of said compartment, one of said pairs of sockets being mounted in a fixed position in said compartment, means for adjustably mounting at least one socket of the other pair, a crossbar connecting the sockets of each pair, a wide strip of flexible material on said crossbar and connecting said bars to each other, said strip of flexible material extending substantially in the longitudinal direction of the vehicle through a region in said compartment normally occupied by the removable seats when said seats are in their normal position, tightening means for shifting said adjustable socket in the longitudinal direction of said compartment for tightening said strip so as to form a tightly stretched cot within said compartment, said adjustable mounting means of one of said sockets and said tightening means each including lever means, said lever means being pivotably secured to said bottom so as to be pivotable in the longitudinal direction of said compartment, and locking means adapted to be secured to a stationary vehicle part near the front end of said compartment and adapted to engage said lever means to lock said lever means in a fixed position after it has been pivoted to tighten said strip, said pairs of sockets being provided at opposite ends of said compartment and at different levels above each other, the corresponding sockets of each pair being disposed at the same level above said bottom, whereby the two ends of said cot may be adjusted to different positions relative to each other.

6. In an automobile having side walls and a bottom enclosing a compartment, at least two pairs of members forming sockets disposed above the level of said bottom, the sockets of each pair being opposite to and spaced from each other, and facing with their openings toward each other transversely of said compartment, one of said pairs being disposed forwardly and another one of said pairs being disposed rearwardly of said compartment, one of said pairs of sockets being mounted in a fixed position in said compartment, means for adjustably mounting at least one socket of the other pair, a crossbar connecting the sockets of each pair, a wide strip of flexible material on said crossbars and connecting said bars to each other, tightening means for shifting said adjustable socket in the longitudinal direction of said compartment for tightening said strip so as to form a tightly stretched cot within said compartment, said adjustable mounting means of one of said sockets and said tightening means comprising a lever, said bottom having a recess therein, the lower end of said lever being mounted in said recess so as to be pivotable in the longitudinal direction of said compartment, said lever having a recess therein forming said adjustable socket, and means secured to a stationary part near the front end of said compartment and adapted to engage with the upper end of said lever for locking said lever in a fixed position after it has been pivoted to tighten said strip.

7. In an automobile as defined in claim 6, in which said locking means comprise a substantially U-shaped member pivotably secured at its two free ends to a stationary forward part of said compartment and adapted to be swung upwardly toward the rear, said lever having a recess on the rear side of its upper end, said U-shaped member being adapted to be hooked over said upper end and into said recess when said lever has been pivoted to tighten said strip, and means for holding said member in the inoperative, forwardly swung position when no cot is installed in said compartment.

8. In an automobile as defined in claim 7, further comprising means for removably securing said rear crossbar substantially at the center thereof to said bottom.

9. In an automobile having side walls and a bottom enclosing a compartment, at least two pairs of members forming sockets disposed above the level of said bottom, the sockets of each pair being opposite to and spaced from each other, and facing with their openings toward each other transversely of said compartment, one of said pairs being disposed forwardly and another one of said pairs being disposed rearwardly of said compartment, one of said pairs of sockets being mounted in a fixed position in said compartment, means for adjustably mounting at least one socket of the other pair, a crossbar connecting the sockets of each pair, a wide strip of flexible material on said crossbars and connecting said bars to each other, tightening means for shifting said adjustable socket in the longitudinal direction of said compartment for tightening said strip so as to form a tightly stretched cot within said compartment, said pair of rearwardly disposed sockets being mounted at opposite points on the inner side walls of said automobile, said rear crossbar traversing said compartment and its ends removably secured in said sockets, said rear crossbar having a length substantially equal to the width of two of said strips, one of the sockets of said forward pair being likewise mounted on said inner side wall, said adjustable means for mounting said other socket of said forward pair compirsing a removable lever, the lower end of said lever being pivotably secured to said bottom so as to be pivotable in the longitudinal direction of said compartment, said lever having a recess therein forming said adjustable socket, said forward crossbar having a length equal to approximately one-half of the length of said rear crossbar and adapted to hold one of said strips, the ends of said forward crossbar being removably secured in said forward sockets, and means secured to a stationary part near the front end of said compartment and adapted to engage with the upper end of said lever for locking said lever in a fixed position after it has been pivoted to tighten said strip.

10. In an automobile as defined in claim 9, in which a plurality of said sockets are provided on at least one side wall near at least the forward end of said compartment and at different levels above each other, and a corresponding number of recesses are provided in said lever to form the opposite sockets of each pair, said sockets of each pair being disposed at the same level when said lever is tightened, whereby the two ends of said cot may be adjusted to different positions relative to each other.

References Cited in the file of this patent

UNITED STATES PATENTS

| | | |
|---|---|---|
| 1,462,667 | Stockland | July 24, 1923 |
| 1,620,433 | Brye | Mar. 8, 1927 |
| 1,722,916 | Heumader | July 30, 1929 |
| 1,744,701 | Ike | Jan. 21, 1930 |
| 1,856,624 | Davis | May 3, 1932 |
| 1,925,607 | Rottmer | Sept. 5, 1933 |
| 2,638,374 | Willson | May 12, 1953 |
| 2,835,903 | Roy | May 27, 1958 |

FOREIGN PATENTS

| | | |
|---|---|---|
| 143,461 | Great Britain | May 27, 1920 |